United States Patent
Roberts et al.

(10) Patent No.: US 10,738,920 B2
(45) Date of Patent: Aug. 11, 2020

(54) COMPOSITE FLUID CONDUIT ASSEMBLY

(71) Applicant: M-Flow Technologies Limited, Abingdon (GB)

(72) Inventors: Richard Damon Goodman Roberts, Southampton (GB); Martin Peter William Jones, Chichester (GB); Luke Rumsey, Fareham (GB); John Brickwood, Southampton (GB); Giles Edward, Abingdon (GB)

(73) Assignee: M-Flow Technologies Limited, Abingdon (GB)

( * ) Notice: Subject to any disclaimer, the term of this patent is extended or adjusted under 35 U.S.C. 154(b) by 20 days.

(21) Appl. No.: 15/565,899

(22) PCT Filed: Apr. 28, 2016

(86) PCT No.: PCT/GB2016/051206
§ 371 (c)(1),
(2) Date: Oct. 11, 2017

(87) PCT Pub. No.: WO2016/174437
PCT Pub. Date: Nov. 3, 2016

(65) Prior Publication Data
US 2018/0313481 A1 Nov. 1, 2018

(30) Foreign Application Priority Data
Apr. 30, 2015 (GB) .................................. 1507401.6

(51) Int. Cl.
*F16L 9/00* (2006.01)
*F16L 23/024* (2006.01)
(Continued)

(52) U.S. Cl.
CPC ........... *F16L 23/024* (2013.01); *F16L 23/006* (2013.01); *F16L 23/22* (2013.01); *G01F 1/58* (2013.01);
(Continued)

(58) Field of Classification Search
CPC ....... F16L 23/024; F16L 23/006; F16L 23/22; G01F 1/58; G01F 1/584; G01F 15/006; G01F 15/14; G01F 15/185
(Continued)

(56) References Cited

U.S. PATENT DOCUMENTS

| 818,272 | A | * | 4/1906 | Moats | ..................... E01F 5/005 405/125 |
| 1,368,632 | A | * | 2/1921 | Israel | ..................... F16L 58/06 427/232 |

(Continued)

FOREIGN PATENT DOCUMENTS

| CN | 203309375 | 11/2013 |
| CN | 203614934 | 5/2014 |

(Continued)

*Primary Examiner* — James F Hook
(74) *Attorney, Agent, or Firm* — Levy & Grandinetti

(57) ABSTRACT

A composite fluid conduit assembly with a fluid conduit having a wall defining a fluid flow path is disclosed. The wall has an inner region and an outer region. The outer region includes a composite material having reinforcing elements within a matrix material and the inner region having a material which is substantially devoid of reinforcing elements. The inner region of the wall defines a first sealing surface around the fluid flow path at one end of the fluid conduit. The composite fluid conduit assembly has an interface member substantially devoid of reinforcing elements and located at the end of the fluid conduit. The interface member defines an aperture in fluid flow communication with the fluid flow path and a second sealing surface. A compression arrangement forces the interface (Continued)

member and the fluid conduit together forming a seal around the fluid flow path between the first and second sealing surfaces.

24 Claims, 8 Drawing Sheets

(51) Int. Cl.
*F16L 23/00* (2006.01)
*F16L 23/22* (2006.01)
*G01F 1/58* (2006.01)
*G01F 15/00* (2006.01)
*G01F 15/14* (2006.01)
*G01F 15/18* (2006.01)
*G01F 1/56* (2006.01)

(52) U.S. Cl.
CPC ............ *G01F 1/584* (2013.01); *G01F 15/006* (2013.01); *G01F 15/14* (2013.01); *G01F 15/185* (2013.01); *G01F 1/56* (2013.01)

(58) Field of Classification Search
USPC .................................. 138/109, 104, 141, 153
See application file for complete search history.

(56) References Cited

U.S. PATENT DOCUMENTS

| 1,533,173 | A | * | 4/1925 | Egloff ..................... C10G 9/08 220/327 |
| 1,686,498 | A | * | 10/1928 | Parker ................... F16L 23/024 285/412 |
| 3,080,201 | A | * | 3/1963 | Escola .................... F16J 10/02 138/89 |
| 3,189,371 | A | * | 6/1965 | Swan .................... F16L 23/125 285/55 |
| 3,722,925 | A | * | 3/1973 | Robbins ............... F16L 15/006 285/341 |
| 4,673,199 | A | | 6/1987 | Renfrew |
| 5,255,974 | A | * | 10/1993 | Signer .................... B01F 5/061 138/108 |
| 5,699,835 | A | * | 12/1997 | Nakagawa .......... B29C 33/0044 138/141 |
| 6,004,639 | A | | 12/1999 | Quigley et al. |
| 6,065,630 | A | * | 5/2000 | Outwater ........... G01N 21/0317 220/327 |
| 8,127,622 | B2 | * | 3/2012 | Kawakami ................ G01F 1/58 73/861.12 |
| 9,022,123 | B2 | * | 5/2015 | Campello ............... E21B 17/00 138/104 |
| 2005/0183514 | A1 | * | 8/2005 | Huybrechts ............. G01F 1/588 73/861.12 |
| 2005/0210997 | A1 | * | 9/2005 | Lincoln ..................... G01F 1/58 73/861.08 |
| 2006/0054231 | A1 | * | 3/2006 | Wolfram ................ B65G 53/32 138/109 |
| 2007/0205106 | A1 | * | 9/2007 | Vigh ..................... B01D 61/425 204/518 |
| 2007/0272549 | A1 | * | 11/2007 | Davis ......................... C25B 9/08 204/260 |
| 2008/0196510 | A1 | * | 8/2008 | Nielsen ..................... G01F 1/58 73/861.12 |
| 2008/0217248 | A1 | * | 9/2008 | Gebauer .................. B01D 15/206 210/656 |
| 2009/0160184 | A1 | * | 6/2009 | Vo ........................... E21B 17/04 285/249 |
| 2014/0182737 | A1 | * | 7/2014 | Jones ..................... G01N 22/00 138/177 |
| 2014/0261843 | A1 | | 9/2014 | Graham |
| 2015/0260662 | A1 | * | 9/2015 | Edward .............. G01N 33/2847 73/579 |
| 2016/0298614 | A1 | * | 10/2016 | Gaillard .................. F04B 9/113 |
| 2017/0030501 | A1 | * | 2/2017 | Dudurovic ............ F16L 23/003 |

FOREIGN PATENT DOCUMENTS

| DE | 102011014225 | 9/2012 |
| DE | 102013107895 | 1/2015 |
| GB | 558085 | 12/1943 |
| GB | 1156875 | 7/1969 |
| GB | 2 335 251 | 9/1999 |
| GB | 1218953.6 | 10/2012 |
| GB | 1218956.9 | 10/2012 |
| GB | 1302969.9 | 2/2013 |
| GB | 1311755.1 | 7/2013 |
| WO | WO 2012/095633 | 7/2012 |
| WO | WO 2014/064437 | 5/2014 |

* cited by examiner

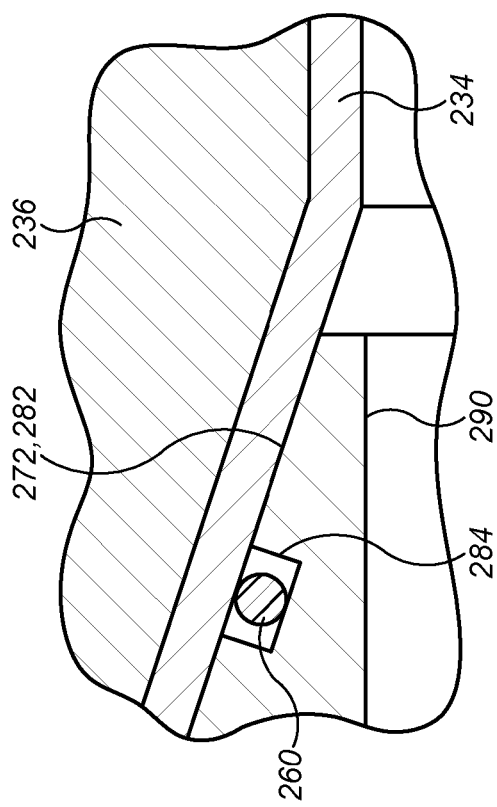
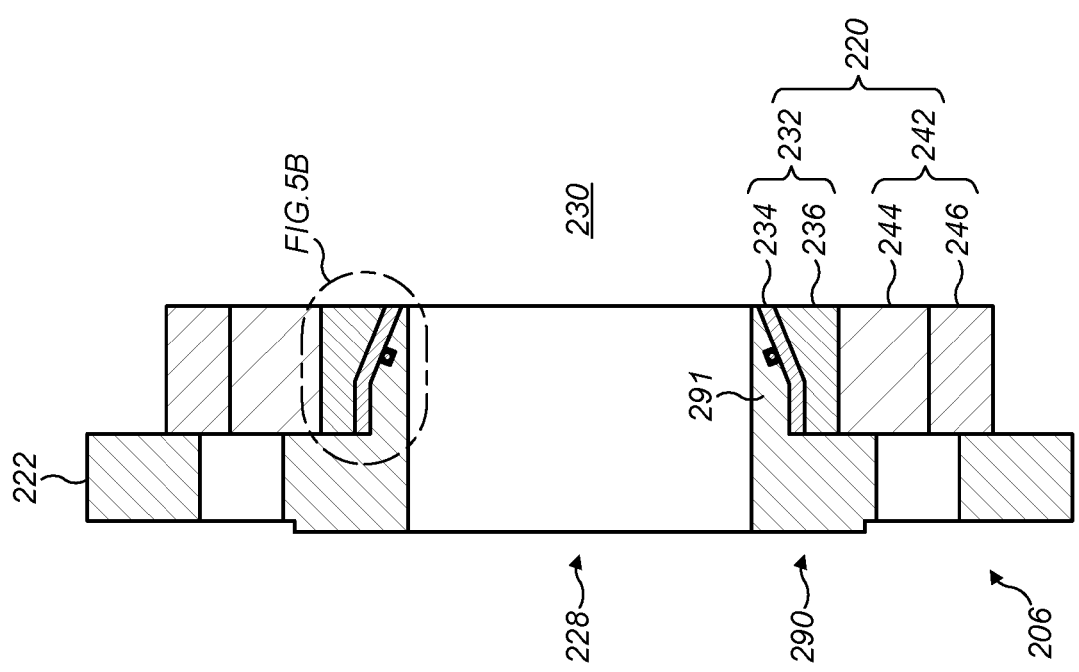

COMPOSITE FLUID CONDUIT ASSEMBLY

FIELD

The present invention relates to a composite fluid conduit assembly configured for connection to a further fluid conduit such as a conventional steel pipe for use, in particular though not exclusively, in the oil and gas industry.

BACKGROUND

Composite fluid conduits offer several advantages over conventional fluid conduits such as steel pipes. For example, composite fluid conduits are capable of withstanding greater strains than steel pipes of comparable dimensions. Composite fluid conduits are also lighter than steel pipes of comparable dimensions.

Composite fluid conduits also have other desirable properties as described in the Applicant's co-pending UK patent application nos. 1218956.9, 1218953.6, 1302969.9 and 1311755.1. A composite fluid conduit may permit greater transmission of different types of energy compared with a wall of a steel pipe. The wall of a composite fluid conduit may permit greater transmission of electromagnetic energy such as a radio frequency (RF) electromagnetic energy or gamma radiation compared with a wall of a steel pipe. The wall of a composite fluid conduit may permit greater transmission of acoustic energy compared with a wall of a steel pipe.

It may be desirable to connect a composite fluid conduit to a conventional fluid conduit such as a steel pipe. For example, in the oil and gas industry, it may be desirable or necessary to form a connection between a composite fluid conduit and a steel pipe which is capable of withstanding pressure differentials of up to 15,000 PSI between a fluid flow path defined internally of the connection and an environment external to the connection.

SUMMARY

It should be understood that one or more features of one aspect of the present invention may apply alone or in any combination in relation to any other aspect of the present invention.

According to a first aspect of the present invention there is provided a composite fluid conduit assembly comprising:

a fluid conduit having a wall defining a fluid flow path, the wall comprising an inner region and an outer region, the outer region comprising a composite material having one or more reinforcing elements embedded within a matrix material and the inner region comprising a material which is substantially devoid of reinforcing elements, wherein the inner region of the wall defines a first sealing surface around the fluid flow path at one end of the fluid conduit;

an interface member located at the end of the fluid conduit, the interface member being substantially devoid of reinforcing elements, the interface member defining an aperture in fluid flow communication with the fluid flow path and the interface member defining a second sealing surface;

a seal arrangement located around the fluid flow path between the fluid conduit and the interface member; and a compression arrangement which forces the interface member and the fluid conduit towards one another so that the seal arrangement forms a seal around the fluid flow path between the first and second sealing surfaces.

The matrix material of the outer region of the wall of the fluid conduit and the material of the inner region of the wall of the fluid conduit may comprise the same material. The matrix material of the outer region of the wall of the fluid conduit may be continuous with the material of the inner region of the wall of the fluid conduit.

The interface member may comprise or be formed from a metal.

The interface member may comprise or be formed from steel.

The interface member may be configured for connection to a further fluid conduit.

The interface member may be configured for connection to a further fluid conduit such as a pipe. The pipe may, for example, be of a standard construction or configuration used in the oil and gas industry. The pipe may, for example, comprise steel. The interface member may serve as an adapter for connection of the composite fluid conduit into a conventional pipeline such as a conventional steel pipeline for the transport of fluids.

The composite fluid conduit assembly may provide a sealed fluid flow path which benefits from the advantages of using a composite fluid conduit whilst also being connectable to a conventional fluid conduit such as a conventional steel pipe.

The interface member may comprise a flange.

The interface member may define a plurality of holes arranged around the aperture, each hole configured to receive at least a portion of a corresponding fastener for securing the interface member to a further fluid conduit. The plurality holes may be configured to match or correspond with a plurality of holes formed through an interface member such as a flange of the further fluid conduit.

The interface member may comprise a hub which is configured to be secured to a further fluid conduit using a clamp. The further fluid conduit may comprise a further hub for this purpose.

The composite fluid conduit assembly may be configured for the transport of fluids in a downhole and/or a subsea environment.

The fluid conduit may be configured to withstand a pressure differential between the fluid flow path and an environment external to the fluid conduit of up to 5,000 PSI, of up to 10,000 PSI or of up to 15,000 PSI.

The composite fluid conduit assembly may be configured to provide pressure integrity between the fluid conduit and the interface member. The composite fluid conduit assembly may be configured to provide pressure integrity between the fluid conduit and the interface member for pressure differentials between the fluid flow path and an environment external to the fluid conduit assembly of up to 5,000 PSI, of up to 10,000 PSI or of up to 15,000 PSI.

The first sealing surface may be defined by a profile formed on an end of the inner region of the wall of the fluid conduit.

The second sealing surface may be defined by the interface member.

The second sealing surface may be defined by a recess formed in an end of the interface member disposed towards the end of the fluid conduit.

The seal arrangement may be provided by direct sealing engagement between the first and second sealing surfaces.

Forming a seal between a first sealing surface which is defined by a material which is substantially devoid of reinforcing elements and a second sealing surface which is also defined by a material which is substantially devoid of reinforcing elements may provide improved sealing performance compared with a seal formed between a first and second sealing surfaces wherein at least one of the first and second sealing surfaces is defined by a composite material.

The seal arrangement may comprise a seal member located between the end of the fluid conduit and the interface member. The seal member may be substantially devoid of reinforcing elements. The seal member may extend around the fluid flow path.

The seal member may define a third sealing surface in direct sealing engagement with the first sealing surface. The seal member may define a fourth sealing surface in direct sealing engagement with the second sealing surface.

The seal member may comprise a rib.

At least one of the interface member and the fluid conduit may define a recess for receiving the rib of the seal member, the recess extending around the fluid flow path.

The interface member may define the recess on a radially inner surface thereof.

The fluid conduit and the interface member may be configured so that an axial dimension of the recess is reduced on movement of the interface member and the fluid conduit towards one another.

The inner region of the wall of the fluid conduit may comprise a flared end portion which defines the sealing surface on a radially inner surface thereof. The seal member may comprise a first lip which defines the third surface on a radially outer surface thereof. The first lip of the seal member may be received within the flared end portion of the inner region of the wall of the fluid conduit so that the first sealing surface and the third sealing surface are sealingly engaged. The first lip of the seal member may extend axially inwardly from the rib.

At least a portion of the aperture of the interface member may be flared towards the fluid conduit so as to define the second sealing surface on an inner surface of the aperture. The seal member may comprise a second lip which defines the fourth sealing surface on a radially outer surface thereof. The second lip of the seal member may be received within the flared portion of the aperture of the interface member so that the fourth sealing surface and the second sealing surface are sealingly engaged. The second lip of the seal member may extend axially outwardly from the rib.

An inner diameter of the seal member may be greater than or equal to an inner diameter of the fluid conduit. Such a seal member may avoid any obstruction of the fluid flow path by the seal member.

An inner diameter of the seal member may be greater than or equal to an inner diameter of the aperture defined by the interface member. Such a seal member may avoid any obstruction of the fluid flow path by the seal member.

The seal member may be generally annular.

The interface member may comprise a flange portion and an annular portion which extends axially from the flange portion.

The annular portion of the interface member may define an outer surface which is tapered for engagement with the first sealing surface.

The seal member may be accommodated within an annular recess defined by the outer surface of the annular portion of the interface member.

The seal member may comprise the same matrix material as the inner and outer regions of the wall of the fluid conduit.

The seal member may comprise an elastomeric material.

The seal member may comprise rubber.

The compression arrangement may comprise a plurality of tie rods, each tie rod being secured to the interface member for pulling the interface member towards the end of the fluid conduit.

The compression arrangement may comprise a tubular member which secures the interface member relative thereto and permits the end of the fluid conduit and the interface member to be forced together.

The composite fluid conduit assembly may comprise a further interface member located at the opposite end of the fluid conduit to the interface member, the further interface member defining a further aperture in fluid flow communication with the fluid flow path.

The further interface member may be identical to the interface member.

The compression arrangement may be configured to urge the interface member and the further interface member towards one another so as to compress the fluid conduit between the interface member and the further interface member. The compression arrangement may be used to compress the fluid conduit for the provision of a compressive pre-load on the fluid conduit. Such a compressive pre-load may allow the fluid conduit to withstand higher operational tensile loads.

The composite fluid conduit assembly may comprise a further seal member located at the opposite end of the fluid conduit to the seal member, the further seal member defining a further aperture in fluid flow communication with the fluid flow path.

The further seal member may be identical to the seal member.

The compression arrangement may be used to energise the seal member and the further seal member simultaneously.

The compression arrangement may comprise a plurality of tie rods, each tie rod connecting the interface member and the further interface member for compression of the fluid conduit therebetween.

The compression arrangement may comprise a tubular member which connects the interface member and the further interface member for compression of the fluid conduit therebetween.

The wall of the fluid conduit may comprise a material which is configured for the transmission therethrough of at least one of electromagnetic energy, gamma radiation, X-rays and acoustic energy.

The inner region of the wall of the fluid conduit may comprise a material which is configured for the transmission therethrough of at least one of electromagnetic energy, gamma radiation, X-rays and acoustic energy.

The material which is configured for the transmission therethrough of at least one of electromagnetic energy, gamma radiation, X-rays and acoustic energy may comprise at least one of a thermoplastic material, a thermoset material, a polyaryl ether ketone, a polyaryl ketone, a polyether ketone (PEK), a polyether ether ketone (PEEK), a polycarbonate, polyvinyl chloride (PVC), a polyamide, polyamide 11 (PA11), polyvinylidene fluoride, polyvinylidene difluoride (PVDF), polyphenylene sulphide (PPS), polyethylenimines (PEI), polyoxymethylene (POM), acetal, a resin, a polymeric resin, and an epoxy resin.

The inner region of the wall of the fluid conduit may be formed from a chemically inert material. The use of such a material may avoid or at least partially reduce any corrosion of the inner region of the wall of the fluid conduit that might otherwise occur.

The inner region of the wall of the fluid conduit may be formed from a material which is impermeable to any fluids which are to be transported through the fluid flow path, for example hydrocarbon fluids and/or water.

The inner region of the wall of the fluid conduit may define an inner surface which is smooth. A smooth inner surface may reduce the build-up of any deposits such as wax, hydrates, or the like in the fluid flow path.

The inner region of the wall of the fluid conduit may be formed solely from the matrix material.

The composite structure of the outer region of the wall of the fluid conduit may provide the fluid conduit with sufficient structural strength to withstand any pressure differentials between the fluid flow path and an environment external to the fluid conduit assembly.

The composite fluid conduit assembly may comprise a cavity member configured so as to provide confinement for an electromagnetic field.

The cavity member may comprise a metal.

The cavity member may comprise one or more reinforcing elements embedded within a matrix material.

Each of the one or more reinforcing elements of the cavity member may be electrically conductive.

Each of the one or more reinforcing elements of the cavity member may comprise a carbon fibre.

The matrix material of the cavity member, the matrix material of the outer region of the wall of the fluid conduit and the material of the inner region of the wall of the fluid conduit may all comprise the same material.

The cavity member may be located externally of, or may be at least partially embedded or at least partially enclosed in, the wall of the fluid conduit.

The cavity member may be defined by the outer region of the wall of the fluid conduit.

The outer region of the wall of the fluid conduit may comprise a material which is configured for the transmission therethrough of at least one of electromagnetic energy, gamma radiation, X-rays and acoustic energy.

The one or more reinforcing elements of the composite material of the outer region of the wall of the fluid conduit may be electrically non-conductive.

The one or more reinforcing elements of the composite material of the outer region of the wall of the fluid conduit may comprise at least one of polymeric fibres, aramid fibres, non-polymeric fibres, basalt fibres, glass fibres and E-glass fibres.

The fluid conduit may comprise a cavity filler member, at least part of which is located between the inner region of the wall of the fluid conduit and the cavity member.

The cavity filler member may comprise a material which is configured so as to permit transmission therethrough of at least one of electromagnetic energy, gamma radiation, X-rays and acoustic energy.

The cavity filler member may comprise the same material as the inner region of the wall of the fluid conduit.

The cavity filler member may comprise the same material as the matrix material of the outer region of the wall of the fluid conduit.

The material of the cavity member may be continuous with the material of the inner region of the wall of the fluid conduit.

The material of the cavity member may be continuous with the matrix material of the outer region of the wall of the fluid conduit.

The composite fluid conduit assembly may comprise a component.

The component may be configured for coupling energy to and/or from the fluid flow path.

The component may comprise an antenna for coupling an electrical signal to and/or from an electromagnetic field which extends at least partially into the fluid flow path.

The component may comprise an antenna.

The component may comprise at least one of a source, a detector, a sensor and/or a transducer for the generation and/or detection of at least one of electromagnetic energy, gamma radiation, X-rays, acoustic energy and strain.

The component may be at least partially embedded or at least partially enclosed in the wall of the fluid conduit.

The component may be embedded or enclosed in the wall of the fluid conduit. This may avoid any requirement for the component to extend into the fluid flow path. This may ensure that the pressure integrity of the fluid flow path is not compromised by the component. This may also avoid obstructing the fluid flow path. This may avoid the accumulation of any particulates, debris or the like that may otherwise occur if the component were to extend into the fluid flow path. Such an arrangement of the component may also allow pigging of the fluid flow path.

The component may be located externally of the wall of the fluid conduit.

The component may be attached to the fluid conduit.

The component may be mounted on an outer surface of the fluid conduit.

The matrix material may comprise a polymer material.

The matrix material may comprise at least one of a thermoplastic material, a thermoset material, a polyaryl ether ketone, a polyaryl ketone, a polyether ketone (PEK), a polyether ether ketone (PEEK), a polycarbonate, polyvinyl chloride (PVC), a polyamide, polyamide 11 (PA11), polyvinylidene fluoride, polyvinylidene difluoride (PVDF), polyphenylene sulphide (PPS), polyethylenimines (PEI), polyoxymethylene (POM), acetal, a resin, a polymeric resin, and an epoxy resin.

According to a second aspect of the present invention there is provided a pipeline comprising a composite fluid conduit assembly and a length of pipe connected to either end of the composite fluid conduit assembly, the composite fluid conduit assembly comprising:

a fluid conduit having a wall defining a fluid flow path, the wall comprising an inner region and an outer region, the outer region comprising a composite material having one or more reinforcing elements embedded within a matrix material and the inner region comprising a material which is substantially devoid of reinforcing elements, wherein the inner region of the wall defines a first sealing surface around the fluid flow path at one end of the fluid conduit;

an interface member located at the end of the fluid conduit, the interface member being substantially devoid of reinforcing elements, the interface member defining an aperture in fluid flow communication with the fluid flow path and the interface member defining a second sealing surface;

a seal arrangement located around the fluid flow path between the fluid conduit and the interface member; and a compression arrangement which forces the interface member and the fluid conduit towards one another so that the seal arrangement forms a seal around the fluid flow path between the first and second sealing surfaces.

According to a third aspect of the present invention there is provided a method for manufacturing a composite fluid conduit assembly, comprising:

providing a fluid conduit having a wall defining a fluid flow path, the wall comprising an inner region and an outer region, the outer region comprising a composite material having one or more reinforcing elements embedded within a matrix material and the inner region comprising a material which is substantially devoid of reinforcing elements, wherein the inner region of the wall defines a first sealing surface around the fluid flow path at one end of the fluid conduit;

locating an interface member at one end of the fluid conduit, such that an aperture defined by the interface member is in fluid flow communication with the fluid flow path, the interface member being substantially devoid of reinforcing elements;

locating a seal arrangement around the fluid flow path between the fluid conduit and the interface member; and forcing the interface member and the fluid conduit towards one another so that the seal arrangement forms a seal around the fluid flow path between the first and second sealing surfaces.

BRIEF DESCRIPTION OF THE DRAWINGS

The present invention will now be described by way of non-limiting example only with reference to the following figures of which:

FIG. 5A is a longitudinal cross-section of an end portion of a third composite fluid conduit assembly;

FIG. 5B is a detail view of FIG. 5A in the vicinity of a seal member;

DETAILED DESCRIPTION OF THE DRAWINGS

Figure 1:
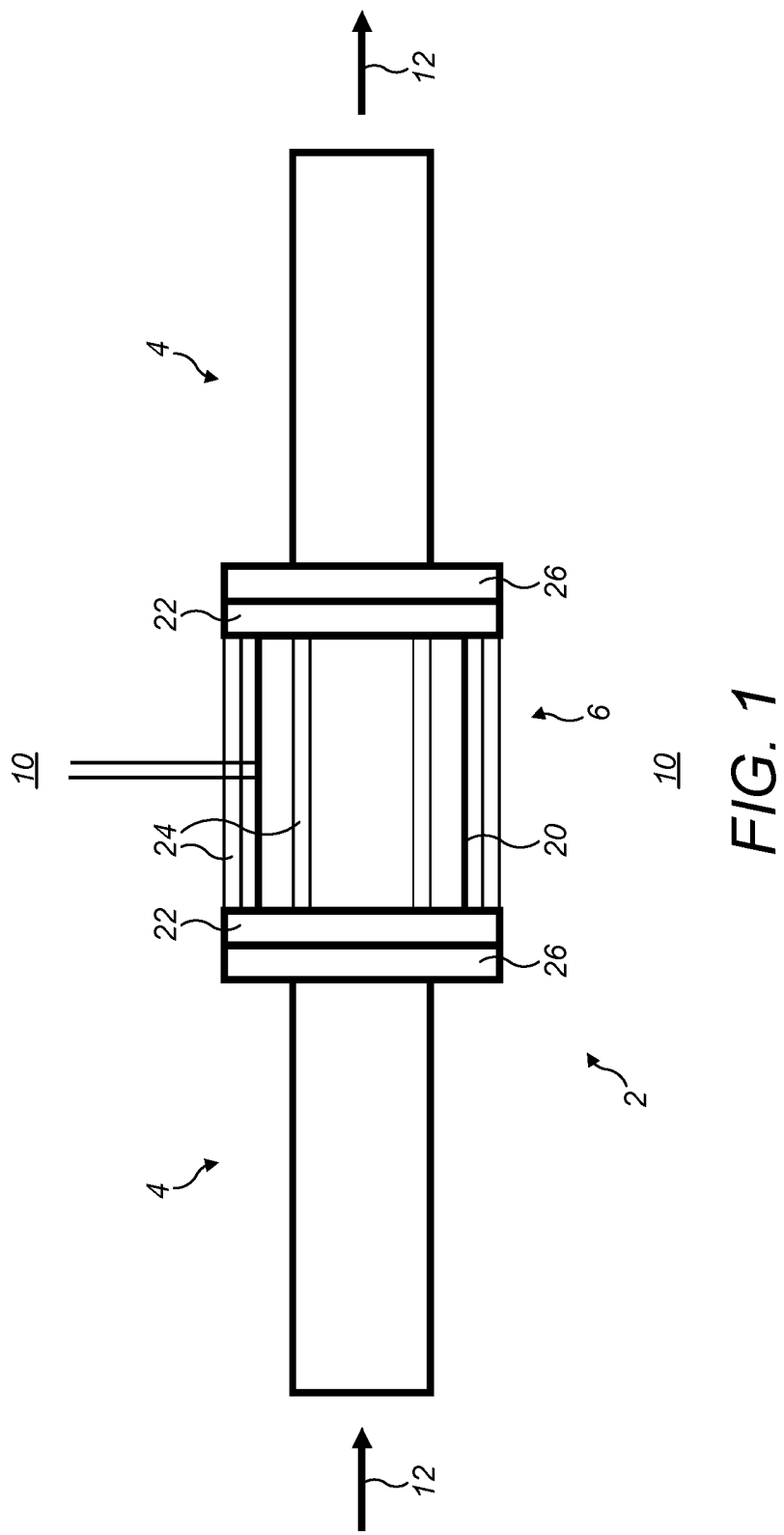
FIG. 1 is a schematic of a pipeline including a first composite fluid conduit assembly.

Referring initially to FIG. 1 there is shown a pipeline generally designated 2 comprising lengths of conventional steel pipe 4 and a composite fluid conduit assembly 6 located therebetween. In use, the pipeline 2 may be located in a relatively harsh external environment 10 such as a downhole environment or a subsea environment. Depending on the application, the pipeline 2 may be subjected to pressure differentials of up to 15,000 PSI and temperatures ranging from several tens of degrees below zero degrees Celsius to a few hundred degrees Celsius. As indicated by the arrows 12 in FIG. 1, the pipeline 2 may be used for the transfer of fluids such as hydrocarbon fluids and/or water.

The fluid conduit assembly 6 comprises a fluid conduit 20, and an interface member in the form of a steel flange 22 located at either end of the fluid conduit 20. The fluid conduit assembly 6 further comprises a compression arrangement in the form of steel tie rods 24 which connect the steel flanges 22 and which may be used to compress the fluid conduit 20 between the steel flanges 22. Each of the steel pipes 4 comprises a steel flange 26 which is connected to a corresponding steel flange 22 of the fluid conduit assembly 6 using conventional fasteners (not shown). In use, the tie rods 24 may be used to compress the fluid conduit 20 for the provision of a compressive pre-load on the fluid conduit 20. Such a compressive pre-load may allow the fluid conduit 20 to withstand higher operational tensile loads.

Figure 2:
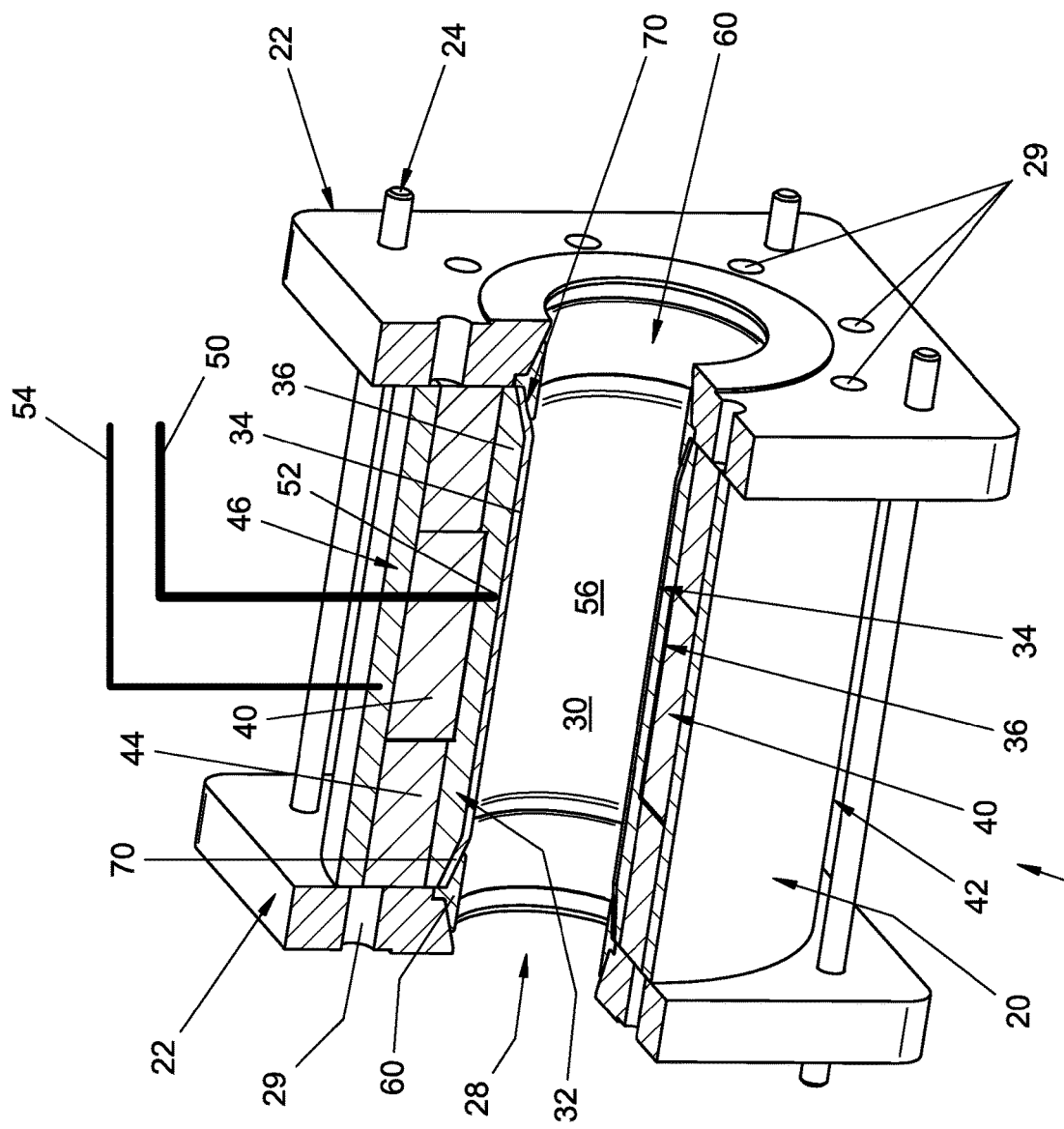
FIG. 2 is a schematic perspective view of the first composite fluid conduit assembly of FIG. 1.
Figure 3:
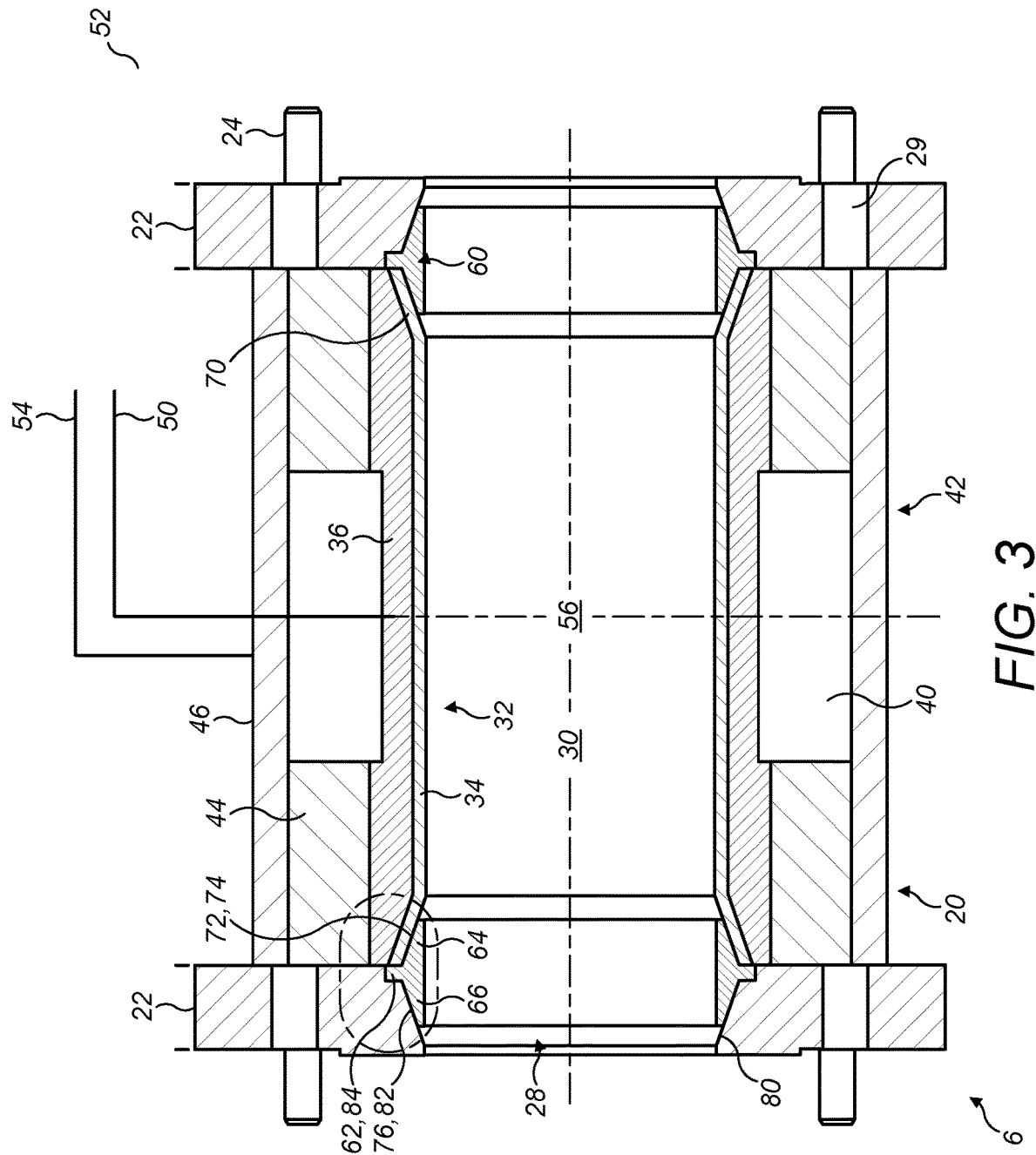
FIG. 3 is a longitudinal cross-section of the first composite fluid conduit assembly of FIGS. 1 and 2.

FIGS. 2 and 3 show the fluid conduit assembly 6 in more detail. One skilled in the art will appreciate that although the fluid conduit assembly 6 described with reference to FIGS. 2 and 3 is configured as a fluid sensor assembly for sensing properties of any fluid present with the fluid conduit assembly 6, the features and advantages associated with the structure of the fluid sensor assembly 6 would apply regardless of whether the fluid conduit assembly 6 was configured as a fluid sensor assembly or not. Although not shown explicitly in FIGS. 2 and 3, it should be understood that the steel tie rods 24 have threaded end portions which are engaged by nuts (not shown) and that the nuts are tightened to connect the steel tie rods 24 to the steel flanges 22 and to force the steel flanges 22 towards one another. Each steel flange 22 further defines an aperture 28 and a plurality of threaded holes 29 arranged around the aperture 28. In use, the steel flanges 22 of the fluid conduit assembly 6 are connected to the steel flanges 26 of the steel pipes 4 using conventional fasteners such as bolts (not shown) which extend through the steel flanges 26 of the steel pipes 4 and threadingly engage the threaded holes 29.

As shown in FIGS. 2 and 3, the fluid conduit 20 defines a fluid flow path 30 therethrough. The fluid conduit 20 comprises a wall 32 comprising a radially inner polyether ether ketone (PEEK) region 34 and a radially outer composite region 36 formed from one or more glass fibres embedded within a PEEK matrix.

The fluid conduit 20 further comprises an electrically non-conductive PEEK cavity filler member 40 located external to the wall 32. The fluid conduit 20 comprises an electrically conductive cavity member 42 located external to, and either end of, the cavity filler member 40. The cavity member 42 comprises one or more carbon fibres embedded within a PEEK matrix. The cavity member 42 is formed around the fluid conduit 20. As shown in FIGS. 2 and 3, the cavity member 42 comprises axial end or cuff regions 44 and a radially outer region 46. The carbon fibres of the cuff regions 44 are arranged substantially circumferentially, whereas the carbon fibres of the radially outer region 46 of the cavity member 42 are arranged at different angles relative to a longitudinal axis of the fluid conduit assembly 6. For example, carbon fibres in different layers of the radially outer region 46 of the cavity member 42 may be arranged at alternating angles relative to the longitudinal axis of the fluid conduit assembly 6 such as alternating positive and negative angles relative to the longitudinal axis of the fluid conduit assembly 6.

The fluid conduit assembly 6 further comprises a first insulated electrical cable 50 accommodated within a channel which extends through a wall of the cavity member 42 and through a wall of the cavity filler member 40 to a position within the wall 32 of the fluid conduit 20. Although not shown explicitly in FIG. 2, it should be understood that the first electrical cable 50 comprises an inner electrical conductor surrounded by an outer electrically insulating coating. The outer electrically insulating coating of the first electrical cable 50 is stripped at a distal end 52 of the first electrical cable 50 so as to expose the inner electrical conductor and thereby create a monopole antenna within the wall 32 of the fluid conduit 20. It should be understood that a potting compound may be used so as to seal any gaps between the cable 50 and at least one of the cavity member 42, the cavity filler member 40 and the wall 32 of the fluid conduit 20 to thereby prevent the ingress of any fluids along the channel which accommodates the first insulated electrical cable 50. Embedding the distal end 52 of the electrical cable 50 within the wall 32 of the fluid conduit 20 avoids any requirement for the electrical cable 50 to extend into the fluid flow path 30. The fluid conduit assembly 6 further comprises a second insulated electrical cable 54 which is electrically connected at one end to the electrically conductive cavity member 42.

The fluid conduit assembly 6 further comprises two annular PEEK seal members 60 located at opposite ends of the fluid conduit 20, each seal member 60 being located between one end of the fluid conduit 20 and the corresponding steel flange 22. Each seal member 60 maintains the pressure integrity of the fluid flow path 30 between the fluid conduit 20 and the adjacent steel flange 22 as will be described in more detail below. As shown in FIG. 3, each seal member 60 comprises a radially extending rib 62, an axially inner lip 64 extending generally axially inwardly from the rib 62 and an axially outer lip 66 extending generally axially outwardly from the rib 62.

The radially inner PEEK region 34 of the wall 32 of the fluid conduit 20 comprises an axial end portion 70 at either end. Each axial end portion 70 is flared towards the corresponding steel flange 22. As shown in more detail in FIG. 3, each flared axial portion 70 of the radially inner PEEK region 34 of the wall 32 of the fluid conduit 20 defines a radially inner first sealing surface 72.

The aperture 28 of each steel flange 22 defines an axial portion 80 which is flared towards the fluid conduit 22. The flared axial portion 80 of the aperture 28 of each steel flange 22 defines a second sealing surface 82. Each steel flange 22 also defines an annular recess 84 defined on a radially inner surface thereof for accommodating the rib 62 of the corresponding seal member 60.

A radially outer surface of the axially inner lip 64 of the seal member 60 defines a third sealing surface 74 which is complementary in shape to the first sealing surface 72 defined by the flared axial portion 70 of the radially inner PEEK region 34 of the wall 32 of the fluid conduit 20. A radially outer surface of the axially outer lip 66 of the seal member 60 defines a fourth sealing surface 76 which is complementary to the second sealing surface 82 defined by the flared axial portion 80 of the aperture 28 of the steel flange 22.

In use, the steel flanges 22 are forced towards one another using the tie rods 24 as described above, so as to compress the rib 62 of each seal member 60 within the annular recess 84 between the corresponding steel flange 22 and the corresponding end of the fluid conduit 20. Each PEEK seal member 60 is sufficiently resilient that the rib 62 of the seal member 60 sealingly engages the annular recess 84, the first sealing surface 72 sealingly engages the third sealing surface 74, and the fourth sealing surface 76 sealingly engages the second sealing surface 82. Such an arrangement provides a PEEK-on-PEEK sealing interface between the first and third sealing surfaces 72, 74 and a PEEK-on-metal sealing interface between the fourth and second sealing surfaces 76, 82. Both of these sealing interfaces have an improved sealing performance relative to a sealing interface which comprises at least one composite material.

The inner diameter of the seal members 60 is comparable to the inner diameter of the fluid flow path 30 defined by the wall 32 of the fluid conduit 20. As such, the seal members 60 do not obstruct the flow of fluid through the fluid flow path 30. Moreover, the use of PEEK for the seal members 60 and the radially inner region 34 of the wall 32 of the fluid conduit 20 provides a relatively smooth, chemically inert and impermeable surface which is generally resistant to the build-up of deposits such as wax, hydrates and the like.

In use, a radio frequency (RF) electrical signal is applied via the cables 50, 54 and is coupled via the antenna at the distal end 52 of the first electrical cable 50 and via the electrically conductive cavity member 42 to a cavity 56 defined by the electrically conductive cavity member 42 so as to establish a RF electromagnetic field within the cavity 56. The orientation of the carbon fibres within the radially outer region 46 of the cavity member 42 serves to confine the electromagnetic field within the cavity 56. The circumferential orientation of the carbon fibres within the cuff regions 44 of the cavity member 42 also serves to selectively suppress the propagation of specific electromagnetic modes out of the cavity 56 along the adjacent steel pipes 4 so as to reduce the loss of electromagnetic energy from the cavity 56. The frequency response of the fluid conduit assembly 6 is measured by transmitting RF electrical signals along the cables 50, 54 and measuring the spectrum of electrical signals reflected back along the cables 50, 54. The composition and/or flow rate of any fluid present in the fluid flow path 30 are determined from resonant features present in the measured frequency spectra of the reflected electrical signals.

Figure 4:
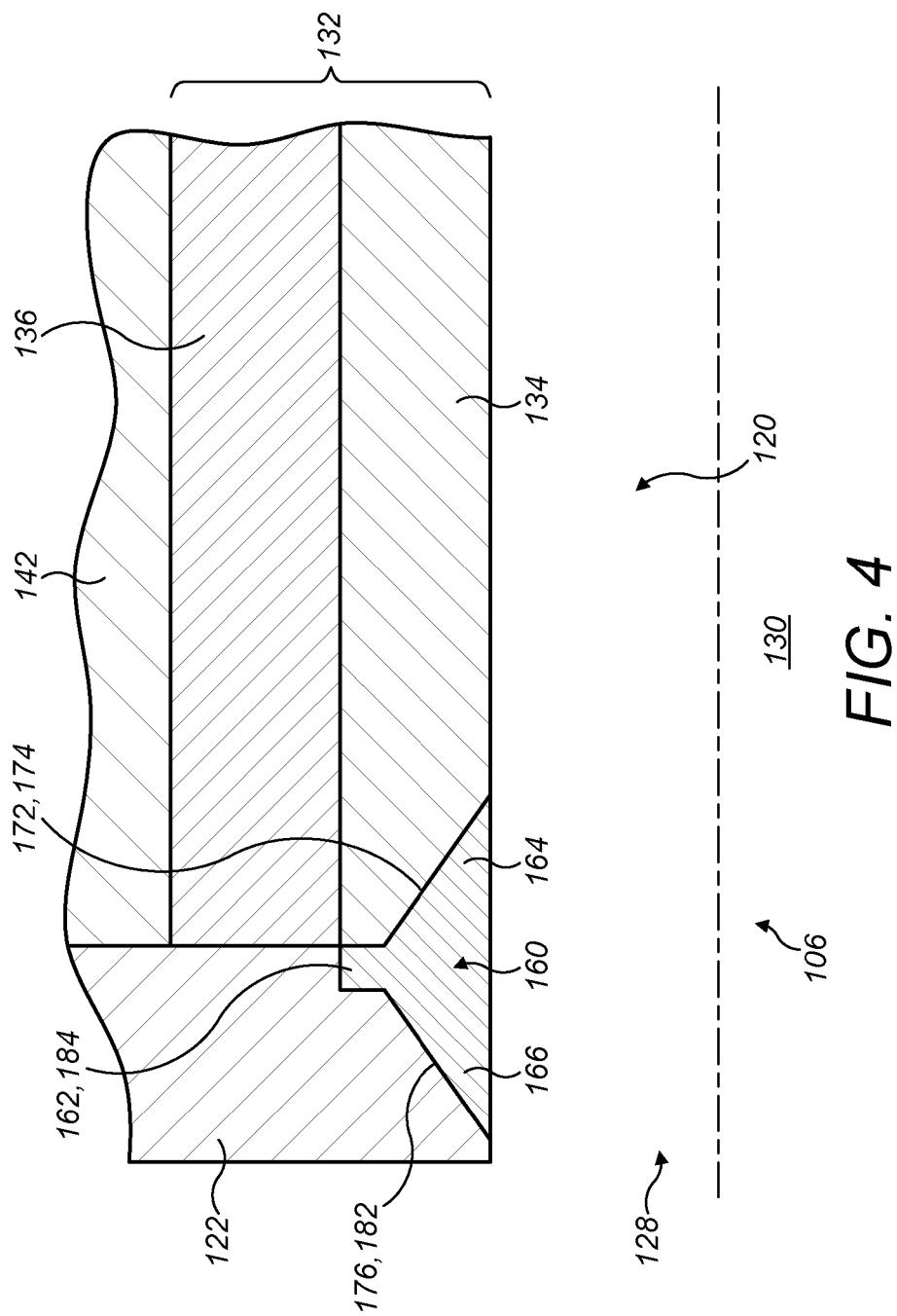
FIG. 4 is a longitudinal cross-section of an end portion of a second composite fluid conduit assembly.

An end portion of a second fluid conduit assembly 106 is shown in FIG. 4. It should be understood that the only portion of the second fluid conduit assembly 106 shown in FIG. 4, is the radially inner portion of the second fluid conduit assembly 106 in the vicinity of a steel flange 122 located at one end of a fluid conduit 120. The second fluid conduit assembly 106 shares many like features with the first fluid conduit assembly 6 shown in FIGS. 2 and 3. As such, features of the second fluid conduit assembly 106 of FIG. 4 have reference numerals which are equal to the reference numerals of like features of the first fluid conduit assembly 6 shown in FIGS. 2 and 3 incremented by "100".

As shown in FIG. 4, the fluid conduit 120 comprises an electrically non-conductive wall generally designated 132 which defines a fluid flow path 130 therethrough. The wall 132 comprises a radially inner polyether ether ketone (PEEK) region 134 defining the fluid flow path 130 and a composite radially outer region 136 formed from one or more glass fibres embedded within a PEEK matrix. The fluid conduit 120 comprises an electrically conductive cavity member 142 located externally of the wall 132.

The fluid conduit assembly 106 further comprises two annular PEEK seal members 160 located at opposite ends of the fluid conduit 120, each seal member 160 being located between one end of the fluid conduit 120 and the corresponding steel flange 122. Each seal member 160 maintains the pressure integrity of the fluid flow path 130 between the fluid conduit 120 and the adjacent steel flange 122 as will be described in more detail below. As shown in FIG. 4, each seal member 160 comprises a radially extending rib 162, an axially inner lip 164 extending generally axially inwardly from the rib 162, and an axially outer lip 166 extending generally axially outwardly from the rib 162.

Unlike the inner PEEK region 34 of the fluid conduit 20 of FIGS. 2 and 3, the inner PEEK region 134 does not include flared axial end portions. Instead, the inner surface of the inner PEEK region 134 is machined to form a first sealing surface 172 at each end of the fluid conduit 120, each sealing surface 172 being flared towards the corresponding steel flange 122.

The aperture 128 of each steel flange 122 defines a second sealing surface 182 which is flared towards the corresponding end of the fluid conduit 120. Each steel flange 122 also defines an annular recess 184 defined on a radially inner surface thereof for accommodating the rib 162 of the corresponding seal member 160.

An outer surface of the axially inner lip 164 of the seal member 160 defines a third sealing surface 174 which is complementary in shape to the first sealing surface 172. An outer surface of the axially outer lip 166 of the seal member 160 defines a fourth sealing surface 176 which is complementary in shape to the second sealing surface 182.

In use, the steel flanges 122 are forced towards one another so as to compress the rib 162 of each seal member 160 within the annular recess 184 between the corresponding steel flange 122 and the corresponding end of the fluid conduit 120. The rib 162 of the seal member 160 sealingly engages the annular recess 184, the first sealing surface 172, sealingly engages the third sealing surface 174, and the fourth sealing surface 176 sealingly engages the second sealing surface 182.

An end portion of a third fluid conduit assembly 206 for use in the pipeline 2 of FIG. 1 is shown in FIGS. 5A and 5B. It should be understood that the only portion of the third fluid conduit assembly 206 shown in FIG. 5A, is the end portion of the third fluid conduit assembly 206 in the vicinity of an interface member 290 located at one end of a fluid conduit 220. The third fluid conduit assembly 206 shares many like features with the first fluid conduit assembly 6 shown in FIGS. 2 and 3. As such, features of the third fluid conduit assembly 206 of FIGS. 5A and 5B have reference numerals which are equal to the reference numerals of like features of the first fluid conduit assembly 6 shown in FIGS. 2 and 3 incremented by "200".

As shown in FIG. 5A, the fluid conduit 220 of the third fluid conduit assembly 206 defines a fluid flow path 230 therethrough. The fluid conduit 220 comprises an electrically non-conductive wall generally designated 232. The wall 232 defines the fluid flow path 230. The wall 232 comprises a radially inner polyether ether ketone (PEEK) region 234 defining the fluid flow path 230 and a composite radially outer region 236 formed from one or more glass fibres embedded within a PEEK matrix. The radially inner PEEK region 234 of the fluid conduit 220 is flared so as to define a flared inner sealing surface 268.

The fluid conduit 220 further comprises an electrically conductive cavity member 242 comprising an electrically conductive composite material which includes one or more carbon fibre reinforcing elements embedded within a PEEK matrix material. As shown in FIG. 5A, the cavity member 242 comprises axial end or cuff regions 244 and a radially outer region 246. The carbon fibres of the cuff regions 244 are arranged substantially circumferentially, whereas the carbon fibres of the radially outer region 246 of the cavity member 242 are arranged at different angles relative to a longitudinal axis of the fluid conduit assembly 206. For example, carbon fibres in different layers of the radially outer region 246 of the cavity member 242 may be arranged at alternating angles relative to the longitudinal axis of the fluid conduit assembly 206 such as alternating positive and negative angles relative to the longitudinal axis of the fluid conduit assembly 206.

The interface member 290 comprises a steel flange 222 and an annular steel projection 291 extending axially inwardly from the steel flange 222. The annular steel projection 291 defines a radially outer surface 282 which tapers in diameter in an axially inward direction towards the sealing surface 272 defined by the radially inner surface of the inner PEEK region 234 of the fluid conduit 220. The interface member 290 defines an aperture 228 therethrough which is aligned with the fluid flow path 230 defined by the fluid conduit 220. As shown in FIG. 5B, the tapered outer surface 282 of the annular steel projection 291 defines an annular recess 284. The third fluid conduit assembly 206 further comprises an elastomeric O-ring seal 260 which is partially accommodated within the annular recess 284.

It should be understood that the third fluid conduit assembly 206 further comprises a further interface member (not shown) which is identical to the interface member 290 but which is located at an opposite end of the fluid conduit 220 and is oriented so that the annular steel projection 291 of the interface member 290 and the annular steel projection of the further interface member are directed towards one another. The third fluid conduit assembly 206 further comprises a further elastomeric O-ring seal (not shown) which is identical to the O-ring seal 260 and which is accommodated in a further annular recess (not shown) which is identical to the annular recess 284 defined in a tapered diameter of the further interface member (not shown). The interface members are connected by tie rods (not shown) like the tie rods 24 discussed in connection with the first fluid conduit assembly 6 of FIGS. 2 and 3.

In use, the interface members 290 are urged towards one another using the tie rods (not shown) so as to compress the elastomeric O-ring seals 260 in the corresponding annular recesses 284 so as to provide a seal at either end of the composite fluid conduit 220 between each interface member 290 and the corresponding end of the composite fluid conduit 220. A seal may also be provided directly between the sealing surface 272 defined by the radially inner surface of the inner PEEK region 234 of the fluid conduit 220 and the tapered radially outer surface 282 defined by the annular steel projection 291.

In a variant of the third fluid conduit assembly 206 (not shown), the annular recesses 284 and the O-ring seals 260 may be omitted altogether. In such a variant, a seal is formed directly between the sealing surface 272 defined by the radially inner surface of the inner PEEK region 234 of the fluid conduit 220 and the tapered radially outer surface 282 defined by the annular steel projection 291.

Figure 6:
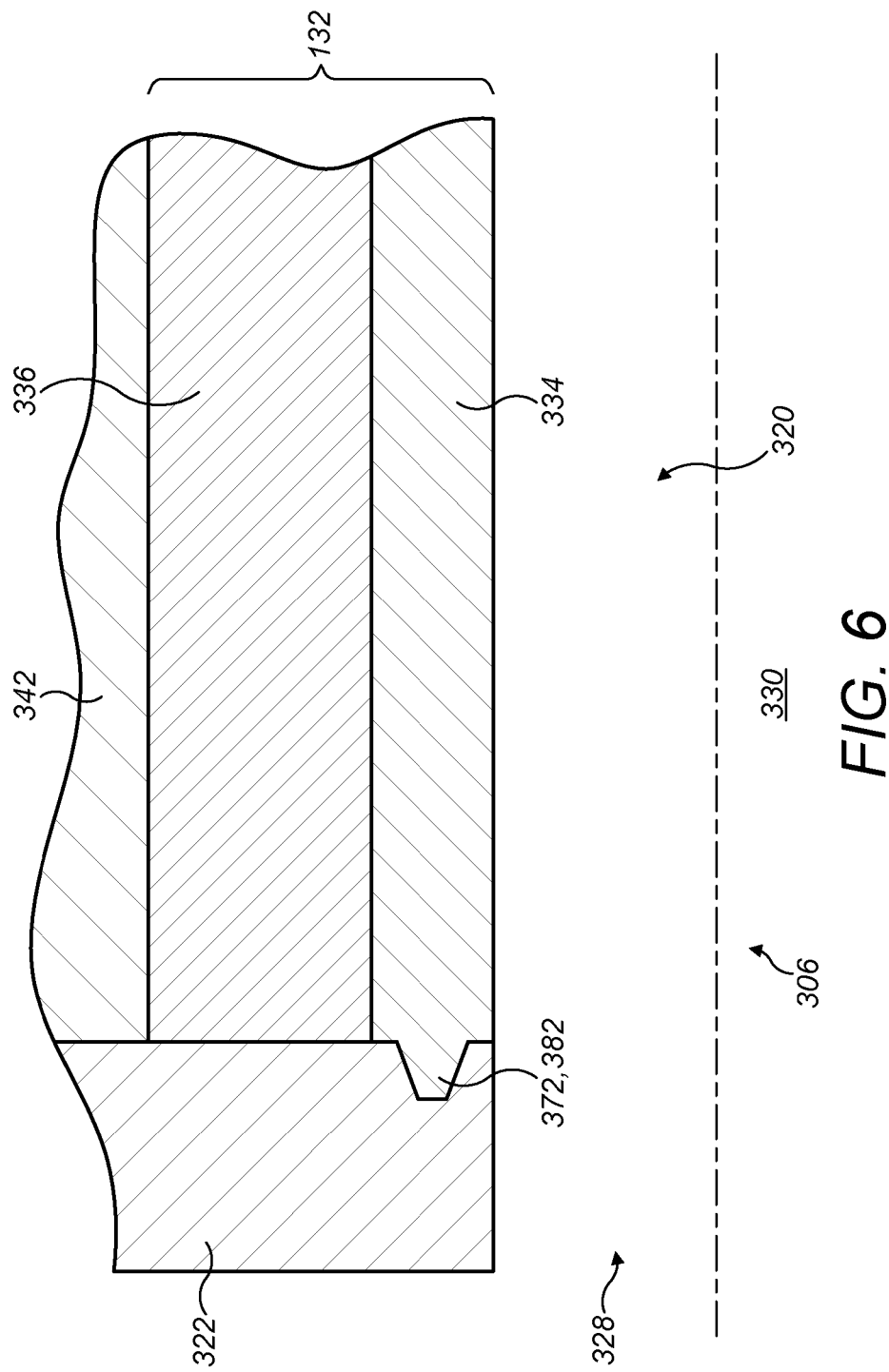
FIG. 6 is a longitudinal cross-section of an end portion of a fourth composite fluid conduit assembly.

An end portion of a fourth fluid conduit assembly 306 is shown in FIG. 6. It should be understood that the only portion of the fourth fluid conduit assembly 306 shown in FIG. 6, is the radially inner portion of the fourth fluid conduit assembly 306 in the vicinity of a steel flange 322 located at one end of a fluid conduit 320. The fourth fluid conduit assembly 306 shares many like features with the first fluid conduit assembly 6 shown in FIGS. 2 and 3. As such, features of the fourth fluid conduit assembly 306 of FIG. 6 have reference numerals which are equal to the reference numerals of like features of the fluid conduit assembly 6 shown in FIGS. 2 and 3 incremented by "300".

As shown in FIG. 6, the fluid conduit 320 comprises an electrically non-conductive wall generally designated 332 which defines a fluid flow path 330 therethrough. The wall 332 comprises a radially inner polyether ether ketone (PEEK) region 334 defining the fluid flow path 330 and a composite radially outer region 336 formed from one or more glass fibres embedded within a PEEK matrix. The fluid conduit 320 comprises an electrically conductive cavity member 342 located externally of the wall 332.

The fourth fluid conduit assembly 306 also comprises a steel flange 322 at either end of the fluid conduit 320. However, unlike the inner PEEK region 34 of the fluid conduit 20 of FIGS. 2 and 3, the inner PEEK region 334 does not include flared axial end portions. Instead, an end of the inner PEEK region 334 is machined to form a first sealing surface in the form of an end profile 372 which is configured for sealing engagement with a complementary second sealing surface in the form of an annular recess 382 defined on an axially inner surface of the corresponding steel flange 322.

In use, the steel flanges 322 are forced towards one another so as to compress the fluid conduit 320 between the steel flanges 322 so that the end profile 372 at each end of the inner PEEK region 334 and the corresponding annular recess 382 defined by the corresponding steel flange 322 are sealingly engaged. As such, use of the fourth fluid conduit assembly 306 eliminates any requirement for a separate sealing member.

Figure 7:
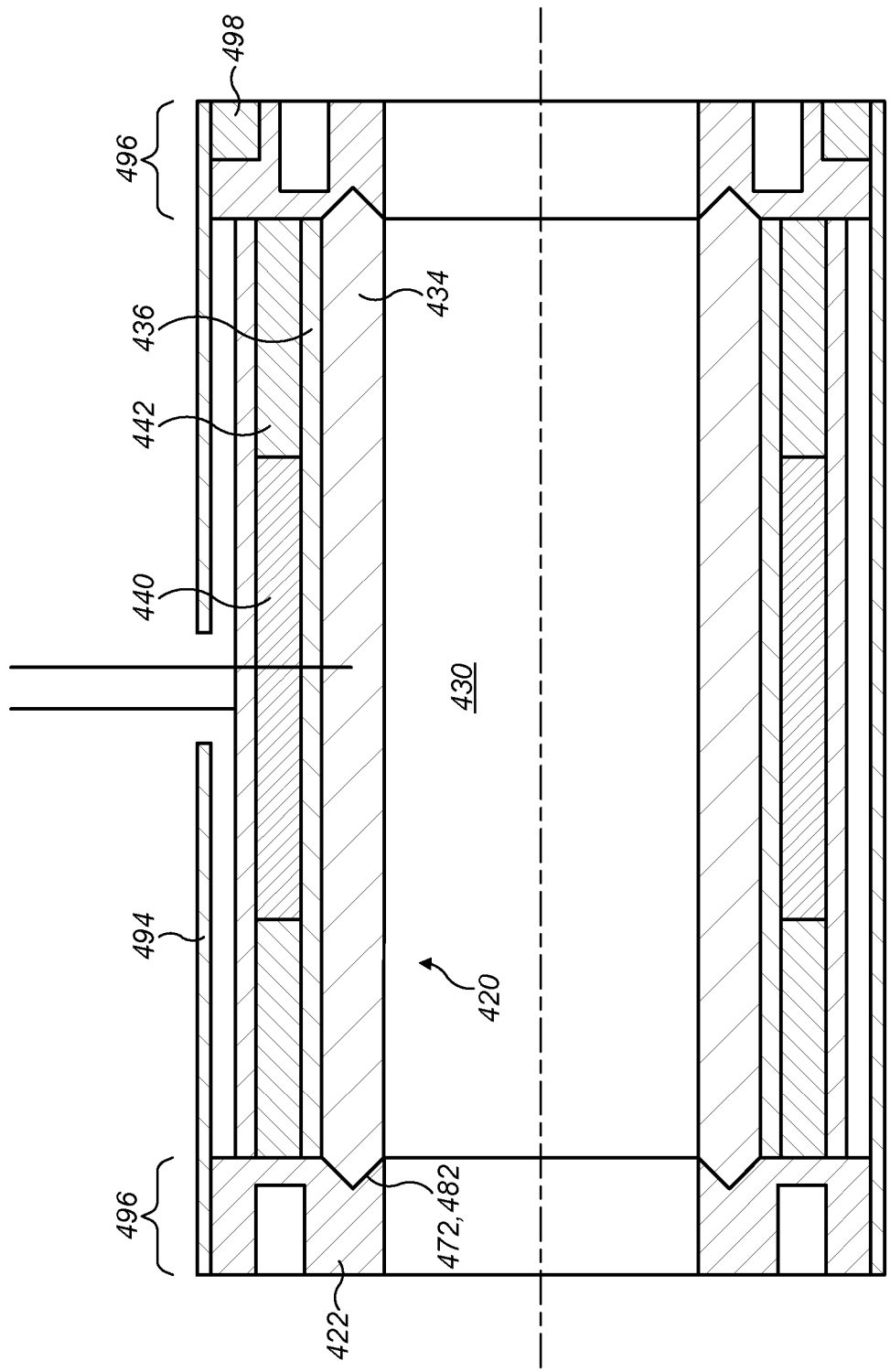
FIG. 7 is a longitudinal cross-section of a fifth composite fluid conduit assembly.

FIG. 7 illustrates a fifth fluid conduit assembly 406. The fifth fluid conduit assembly 406 shares many like features with the fourth fluid conduit assembly 306 described with reference to FIG. 6. As such, features of the fifth fluid conduit assembly 406 of FIG. 7 have reference numerals which are equal to the reference numerals of like features of the fluid conduit assembly 306 incremented by "100".

As shown in FIG. 7, the fluid conduit 420 comprises an electrically non-conductive wall generally designated 432 which defines a fluid flow path 430 therethrough. The wall 432 comprises a radially inner polyether ether ketone (PEEK) region 434 defining the fluid flow path 430 and a composite radially outer region 436 formed from one or more glass fibres embedded within a PEEK matrix. The fluid conduit 420 comprises an electrically non-conductive PEEK cavity filler member 440 located externally of the wall 432 and an electrically conductive cavity member 442 located externally of the cavity filler member 440.

The fifth fluid conduit assembly 406 also comprises a steel flange 422 at either end of the fluid conduit 420. Like the fourth fluid conduit assembly 306, an end of the inner PEEK region 434 of the fluid conduit 420 of the fifth fluid conduit assembly 406 is machined to form a first sealing surface in the form of an end profile 472 which is configured for sealing engagement with a complementary second sealing surface in the form of an annular recess 482 defined on an axially inner surface of the corresponding steel flange 422.

However, unlike the fourth fluid conduit assembly 306, each steel flange 422 defines a screw thread on a radially outer surface thereof. Moreover, the fifth fluid conduit assembly 406 comprises a compression arrangement in the form of a tubular member 494 which defines internal screw threaded portions 496 at either end. The fifth fluid conduit assembly 406 further comprises a lock ring 498 which defines a screw thread on a radially outer surface thereof.

In use, a first steel flange 422 threadingly engages a screw threaded portion 496 at one end of the tubular member 494. The fluid conduit 420 is inserted into the tubular member 494 and the second steel flange 422 threadingly engages the screw threaded portion 496 at the opposite end of the tubular member 494 thereby compressing the fluid conduit 420 between the steel flanges 422 such that the end profile 472 at each end of the inner PEEK region 434 sealingly engages the corresponding annular recess 482 defined by the corresponding steel flange 422. The lock ring 498 threadingly engages the screw threaded portion 496 at the opposite end of the tubular member 494 so as to lock the steel flanges 422 in place either end of the fluid conduit 420.

Figure 8:
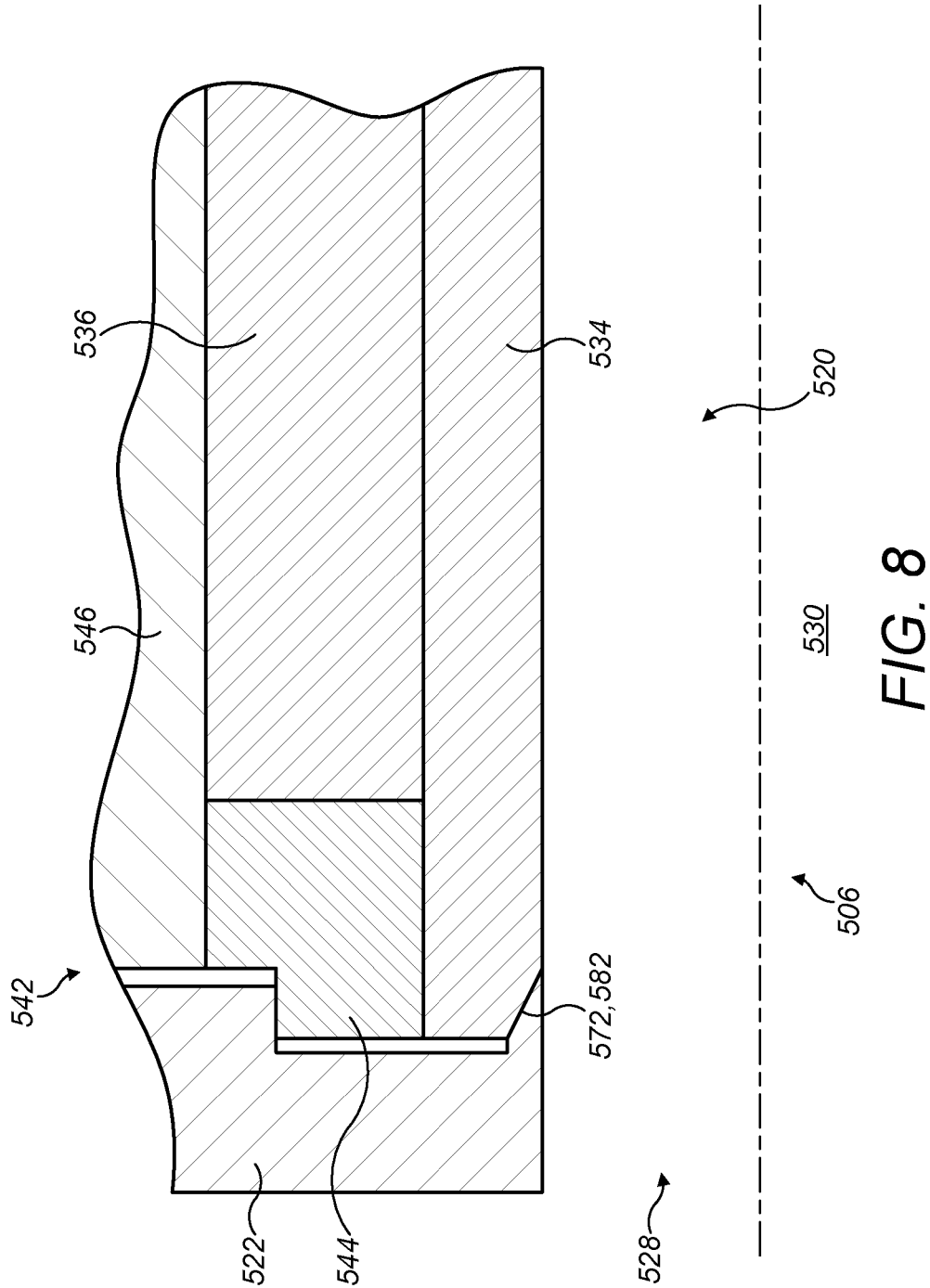
FIG. 8 is a longitudinal cross-section of a sixth composite fluid conduit assembly.

An end portion of a sixth fluid conduit assembly 506 is shown in FIG. 8. It should be understood that the only portion of the sixth fluid conduit assembly 506 shown in FIG. 8, is the radially inner portion of the sixth fluid conduit assembly 506 in the vicinity of a steel flange 522 located at one end of a fluid conduit 520. The sixth fluid conduit assembly 506 shares many like features with the first fluid conduit assembly 6 shown in FIGS. 2 and 3. As such, features of the sixth fluid conduit assembly 506 of FIG. 8 have reference numerals which are equal to the reference numerals of like features of the fluid conduit assembly 6 shown in FIGS. 2 and 3 incremented by "500".

As shown in FIG. 8, the fluid conduit 520 comprises a radially inner polyether ether ketone (PEEK) region 534 defining the fluid flow path 530 and a radially outer PEEK region 536. The outer PEEK region 536 may be formed in situ on or around the inner PEEK region 534. The outer PEEK region 536 may, for example, be formed by applying or wrapping one or more pre-formed PEEK tapes around the inner PEEK region 534 and, optionally, the outer PEEK region 536 may be machined to provide a desired shape or profile. Alternatively, the inner PEEK region 534 may be provided as a PEEK sleeve and the outer PEEK region 536 may be provided as one or more separately formed PEEK cavity filler members which are asssembled over the PEEK sleeve. The fluid conduit 520 further comprises an electrically conductive cavity member 542 located external to, and either end of, the outer PEEK region 536. The cavity member 542 comprises one or more carbon fibres embedded within a PEEK matrix. The cavity member 542 is formed around the fluid conduit 520. As shown in FIG. 8, the cavity member 542 comprises axial end or cuff regions 544 and a radially outer region 546. The carbon fibres of the cuff regions 544 are arranged substantially circumferentially, whereas the carbon fibres of the radially outer region 546 of the cavity member 542 are arranged at different angles relative to a longitudinal axis of the fluid conduit assembly 506. For example, carbon fibres in different layers of the radially outer region 546 of the cavity member 542 may be arranged at alternating angles relative to the longitudinal axis of the fluid conduit assembly 506 such as alternating positive and negative angles relative to the longitudinal axis of the fluid conduit assembly 506.

The sixth fluid conduit assembly 506 also comprises a steel flange 522 at either end of the fluid conduit 520. An end of the inner PEEK region 534 is machined to form a first sealing surface 572 having an axially outwardly tapered end profile which is configured for sealing engagement with a complementary second sealing surface 582 defined on an axially inner surface of the corresponding steel flange 522.

In use, the steel flanges 522 are forced towards one another so as to compress the fluid conduit 520 between the steel flanges 522 so that the first and second sealing surfaces 572, 582 at each end of the inner PEEK region 534 are sealingly engaged. As such, use of the sixth fluid conduit assembly 506 eliminates any requirement for a separate sealing member. It should be understood that compression of the fluid conduit 520 between the steel flanges 522 may be accomplished using a an arrangement of tie rods (not shown) like the arrangement of tie rods 24 shown in FIGS. 2 and 3. Additionally or alternatively, compression of the fluid conduit 520 between the steel flanges 522 may be accomplished using a compression arrangement in the form of an outer tubular member (not shown) which defines female threaded end portions (not shown) at either end like the female threaded end portions 496 of the outer tubular member 494 of FIG. 7. Each steel flange 522 may comprise a male thread formed on an outer surface thereof for threading engagement with the female threaded end portions of the outer tubular for compression of the fluid conduit 520 between the steel flanges 522. A lock ring (not shown) may also be provided like the lock ring 498 of FIG. 7 so as to lock the steel flanges 522 in place either end of the fluid conduit 520.

One skilled in the art will appreciate that various modifications may be made to the fluid conduit assemblies described above without departing from the scope of the present invention. For example, although the fluid conduit assembly 6 described above with reference to FIGS. 1 to 7 is an RF fluid sensor, it should be understood that the fluid conduit assembly 6 may not necessarily be a fluid sensor, but may comprise a composite fluid conduit having metal interface components and annular seals at either end without a RF antenna of any kind.

The fluid conduit assembly may comprise one or more further components. For example, the fluid conduit assembly may comprise one or more gamma radiation sources and/or one or more gamma radiation detectors. The fluid conduit assembly may comprise one or more acoustic transducers. It should be understood that, in such an arrangement, the one or more further components may be located externally of, or may be at least partially embedded or at least partially enclosed within, a wall of the fluid conduit so as to avoid any requirement for the one or more components or any associated cabling to extend into a fluid flow path defined by the fluid conduit.

The wall of the fluid conduit may comprise a polymer material of any kind. For example, the wall may comprise at least one of a thermoplastic material, a thermoset material, a polyaryl ether ketone, a polyaryl ketone, a polyether ketone (PEK), a polyether ether ketone (PEEK), a polycarbonate, polyvinyl chloride (PVC), a polyamide, polyamide 11 (PA11), polyvinylidene fluoride, polyvinylidene difluoride (PVDF), polyphenylene sulphide (PPS), polyethylenimines (PEI), polyoxymethylene (POM), acetal, a resin, a polymeric resin, and an epoxy resin.

The wall may comprise one or more reinforcing elements. For example, the wall may comprise at least one of polymeric fibres, aramid fibres, non-polymeric fibres, basalt fibres, glass fibres and E-glass fibres.

Rather than comprising a cavity member which is additional to the composite outer region of the wall of the fluid conduit, the outer region of the wall of the fluid conduit may define the cavity member.

The cavity member may be formed separately from the fluid conduit and then assembled or fitted on or around the fluid conduit.

The cavity member may comprise an electrically conductive composite material which includes one or more electrically insulating reinforcing elements embedded within an electrically conductive matrix material.

The cavity member may comprise an electrically conductive composite material which includes one or more electrically conductive reinforcing elements embedded within an electrically insulating matrix material. Each reinforcing element may comprise a fibre, strand, particle, nanotube or the like.

The one or more reinforcing elements of the cavity member may comprise carbon fibres.

The cavity member may comprise a matrix material which is continuous with a matrix material of the wall of the fluid conduit.

The cavity member may comprise a metal such as copper, steel, aluminium and/or the like.

The invention claimed is:

1. A subsea composite fluid conduit assembly comprising:
a fluid conduit having a wall defining a fluid flow path, the wall comprising an inner region and an outer region, the outer region comprising a composite material having one or more reinforcing elements embedded within a matrix material and the inner region comprising a material which is substantially devoid of reinforcing elements, wherein the inner region of the wall defines a first sealing surface around the fluid flow path at either end of the fluid conduit;
a first interface member located at one end of the fluid conduit and a second interface member located at the opposite end of the fluid conduit, the first and second interface members being substantially devoid of reinforcing elements, the first and second interface members defining an aperture in fluid flow communication with the fluid flow path and the first and second interface members each defining a second sealing surface;
a first and second seal arrangement located around the fluid flow path between the fluid conduit and each of the first and second interface members, the first and second seal arrangement each comprising a seal member, the seal member having an inner diameter equal to or greater than an inner diameter of the fluid conduit, the seal member inner diameter is also greater than or equal to the an inner diameter of the aperture of the first and second interface members; and
a compression arrangement which forces the first and the second interface members and the fluid conduit towards one another so that the first and second seal arrangement forms a seal around the fluid flow path between the first and second sealing surfaces wherein the compression arrangement comprises tie rods which secure the first and second interface members relative thereto and permits each end of the fluid conduit to be forced towards the respective interface member.

2. The subsea composite fluid conduit assembly according to claim 1, wherein the matrix material of the outer region of the wall of the fluid conduit and the material of the inner region of the wall of the fluid conduit comprise the same material.

3. The subsea composite fluid conduit assembly according to claim 1, wherein the first sealing surface is defined by a profile formed on either end of the inner region of the wall of the fluid conduit.

4. The subsea composite fluid conduit assembly according to claim 1, wherein the second sealing surface is defined by a recess formed in an end of each the first and second interface member disposed towards the respective end of the fluid conduit.

5. The subsea composite fluid conduit assembly according to claim 1, wherein each the first and second seal arrangements are provided by direct sealing engagement between the first and second sealing surfaces.

6. The subsea composite fluid conduit assembly according to claim 1, wherein each the first and second seal arrangements comprise the seal member located between either end of the fluid conduit and the respective first and second interface member, wherein the seal member is substantially devoid of reinforcing elements and the seal member defines a third sealing surface in direct sealing engagement with the first sealing surface and a fourth sealing surface in direct sealing engagement with the second sealing surface.

7. The subsea composite fluid conduit assembly according to claim 6, wherein the inner region of the wall of the fluid conduit comprises a flared end portion, at either end of the fluid conduit, which defines the first sealing surface on a radially inner surface thereof and the seal member comprises a first lip which defines the third sealing surface on a radially outer surface thereof, and wherein the first lip of the seal member is received within the flared end portion of the inner region of the wall of the fluid conduit so that the first and second sealing surfaces are sealingly engaged.

8. The subsea composite fluid conduit assembly according to claim 7, wherein at least a portion of the aperture of each the first and second interface member is flared towards the fluid conduit so as to define the second sealing surface on a radially inner surface of the aperture, and the seal member comprises a second lip which defines the fourth sealing surface on a radially outer surface thereof, and wherein the second lip of the seal member is received within the flared portion of the aperture of the first and second interface member so that the second sealing surface and the fourth sealing surface are sealingly engaged.

9. The subsea composite fluid conduit assembly according to claim 6, wherein the seal member comprises a rib and at least one of the first and second interface member or either end of the fluid conduit defines a recess for receiving the rib, the recess extending around the fluid flow path.

10. The subsea composite fluid conduit assembly according to claim 9, wherein the each the first and second interface member defines the recess on a radially inner surface thereof.

11. The subsea composite fluid conduit assembly according to claim 9, wherein either end of the fluid conduit and each the first and second interface member are configured so that an axial dimension of the recess is reduced on movement of each the first and second interface member and the fluid conduit towards one another.

12. The subsea composite fluid conduit assembly according to claim 6, wherein the seal member is generally annular.

13. The subsea composite fluid conduit assembly according to claim 6, wherein each the first and second interface member comprises a flange portion and an annular portion which extends axially from the flange portion.

14. The subsea composite fluid conduit assembly according to claim 13, wherein the inner region of the wall of the fluid conduit comprises a flared end portion, at each end of the fluid conduit, which defines the first sealing surface on an inner surface thereof and the annular portion of the metallic interface member defines an outer surface which is tapered for engagement with the first sealing surface.

15. The subsea composite fluid conduit assembly according to claim 14, wherein the seal member is accommodated within an annular recess defined by the outer surface of the annular portion of each the first and second interface member.

16. The subsea composite fluid conduit assembly according to claim 1, comprising a cavity member configured so as to provide confinement for an electromagnetic field.

17. The subsea composite fluid conduit assembly according to claim 16, wherein the cavity member comprises one or more reinforcing elements embedded within a matrix material, wherein each of the one or more reinforcing elements of the cavity member are electrically conductive.

18. The subsea composite fluid conduit assembly according to claim 17, wherein each of the one or more reinforcing elements of the cavity member comprise a carbon fibre.

19. The subsea composite fluid conduit assembly according to claim 17, wherein the matrix material of the cavity member, the matrix material of the outer region of the wall of the fluid conduit and the material of the inner region of the wall of the fluid conduit all comprise the same material.

20. The subsea composite fluid conduit assembly according to claim 1, comprising a component, wherein the component is configured to couple an electrical signal to and/or from an electromagnetic field which extends at least partially into the fluid flow path.

21. The subsea composite fluid conduit assembly according to claim 20, wherein the component comprises an antenna.

22. The subsea composite fluid conduit assembly according to claim 20, wherein the component comprises at least one of a source, a detector, a sensor and/or a transducer for the generation and/or detection of at least one of electromagnetic energy, gamma radiation, X-rays, acoustic energy, and strain.

23. The subsea composite fluid conduit assembly according to claim 1, wherein the matrix material comprises at least one of a thermoplastic material, a thermoset material, a polyaryl ether ketone, a polyaryl ketone, a polyether ketone (PEK), a polyether ether ketone (PEEK), a polycarbonate, polyvinyl chloride (PVC), a polyamide, polyamide 11 (PA11), polyvinylidene fluoride, polyvinylidene difluoride (PVDF), polyphenylene sulphide (PPS), polyethylenimines (PEI), polyoxymethylene (POM), acetal, a resin, a polymeric resin, and an epoxy resin.

24. A method for manufacturing a subsea composite fluid conduit assembly, comprising:
    providing a fluid conduit having a wall defining a fluid flow path, the wall comprising an inner region and an outer region, the outer region comprising a composite material having one or more reinforcing elements embedded within a matrix material and the inner region comprising a material which is substantially devoid of reinforcing elements, wherein the inner region of the wall defines a first sealing surface around the fluid flow path at either end of the fluid conduit;
    locating a first interface member at one end of the fluid conduit, and a second interface member located at the opposite end of the fluid conduit, such that an aperture defined by the first and second interface members are in fluid flow communication with the fluid flow path, each the first and second interface member being substantially devoid of reinforcing elements;
    locating a first and second seal arrangement around the fluid flow path between the fluid conduit and each the first and second interface member, the first and second seal arrangement each comprising a seal member, the seal member having an inner diameter equal to or greater than an inner diameter of the fluid conduit, the seal member inner diameter is also greater than or equal to the inner diameter of the aperture of the first and second interface members; and
    forcing each the first and second interface member and the fluid conduit towards one another so that the first and second seal arrangement forms a seal around the fluid flow path between the first and second sealing surfaces wherein the compression arrangement comprises tie rods which secure the first and second interface members relative thereto and permits each end of the fluid conduit to be forced towards the respective interface member.

* * * * *